United States Patent Office 2,881,222
Patented Apr. 7, 1959

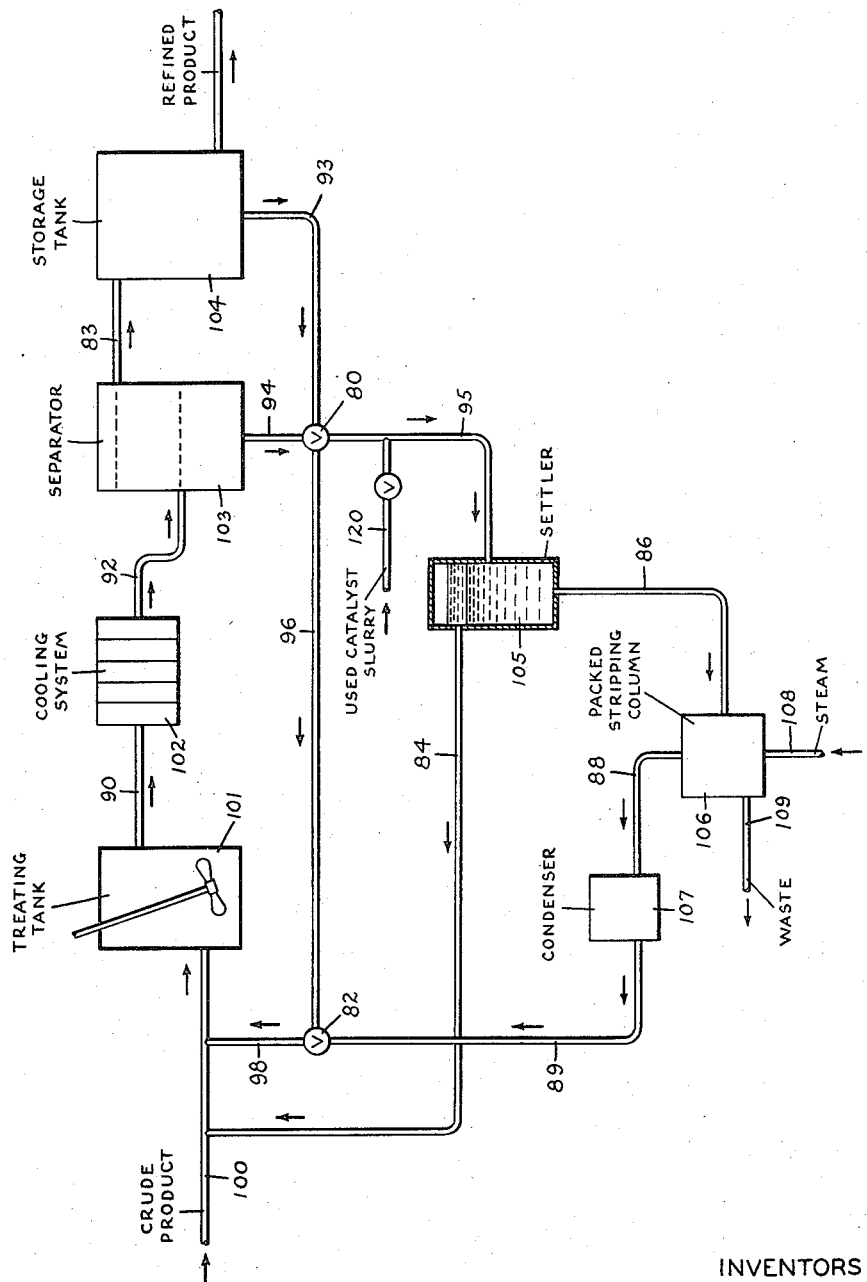

2,881,222

REMOVAL OF ACIDIC IMPURITIES FROM CRUDE PHENOLIC PRODUCTS

George G. Joris, Madison, and Logan C. Bostian, Convent Station, N.J., assignors to Allied Chemical Corporation, New York, N.Y., a corporation of New York Application March 15, 1956, Serial No. 571,837

4 Claims. (Cl. 260—621)

This invention relates to an improved process for the manufacture of phenol and refers in particular to the step of removing acidic impurities from crude phenolic products.

In the course of the preparation of phenols from tertiary alkyl (including cycloalkyl) aromatic compounds, such as cumene, cymene, cyclohexyl benzene and isopropyl naphthalene, a hydroperoxide decomposition product is formed which contains corrosive acidic impurities. It is desirable to remove these impurities before attempting to recover the phenol and ketone in order to prevent excessive corrosion of the recovery equipment, as well as to insure the production of a phenol of high quality.

Many methods for removing the acidic impurities from the crude phenolic products have been given consideration, but all of these have some disadvantages. It has, for example, been found that if the decomposition product is treated with an alkali hydroxide or an alkali metal carbonate, some phenate will be formed which will then require further processing steps for the recovery of the phenol from the phenate; or the agent or its reaction product may be deposited as scale on the equipment used during subsequent product recovery steps and also may corrode the equipment.

It is accordingly an object of this invention to provide a simple, economic method for removing acidic impurities from the crude phenolic products.

It is a further object of this invention to provide a method of removing the acidic impurities without the use of materials which will tend to contaminate apparatus used in subsequent processing steps.

It is a still further object of this invention to provide a method of removing acidic impurities from the crude phenolic products which will permit the obtaining of phenol of high quality.

In accordance with this invention it has been found that these and other objects and advantages can be obtained by treating crude tertiary hydrocarbon substituted aromatic hydroperoxide decomposition product with alkaline earth metal carbonate and mechanically separating the carbonate for instance by settling or centrifuging, whereby acidic impurities are removed from the remainder of the decomposition products prior to separation of ketone.

In the following description the process will be exemplified by its application to the manufacture of phenol from cumene, but it will be understood to be similarly applicable to manufacture of phenols from other tertiary alkyl aromatic compounds.

The invention has special application to processes involving oxidation of cumene in the presence of solid alkali or alkaline earth carbonates as described in U.S.P.'s 2,577,768, 2,613,227 and 2,681,936.

The accompanying drawing is a diagrammatic flow sheet illustrating a treatment system embodying the features of this invention. Conventional shut-off valves, pumps etc. have been omitted for simplicity.

In accordance with the process as therein shown a crude cumene hydroperoxide decomposition product is fed through line 100 into a treating tank 101 of suitable dimensions along with a slurry of finely divided alkaline earth metal carbonate wherein they are thoroughly mixed together at a temperature of about 90° C. As the slurry and admixed product leave the treating tank through line 90, they are fed through a series of heat exchangers 102 which drop the temperature to about 50° C. This drop in temperature serves to decrease the solubility of the water in the product. The product is thereupon fed through line 92 into a separating tank 103 in which the mixture separates into two layers with the water, carbonate, and neutralized acid impurities settling to the bottom in the form of a slurry. The major portion of this slurry is drawn from the bottom of tank 103 through lines 94, 96, 98 and valves 80 and 82 and is recycled through the treating tank 101 through line 94, valve 80 and line 95 while the remainder is fed into a second settling tank 105.

In those cases in which this process is used in conjunction with a process involving oxidation of cumene in the presence of solid calcium carbonate as described in U.S. Patent No. 2,613,227, the used calcium carbonate which may be recovered from the oxidized products by centrifugal separation may be combined with the aqueous bleed being fed to the settling tank 105. The feed line for such addition is shown in the drawing as feed line 120. By combining the two materials the organics associated with the used calcium carbonate function as an extracting liquor for the aqueous bleed. This results in an operation which provides for both recovery of organics and formation of a waste product in disposable form from the used carbonate recovered from the oxidation process.

The top layer from the separator 103 is drawn off in the form of a purified decomposition product and fed through line 83 to a storage tank 104 or if desired directly to a still (not shown) for the removal therefrom of lower boiling constituents such as acetone. If the temperature of the material in the tank 104 drops materially, water may settle out and this can be drawn from the bottom through line 93 and sent to the treatment tank 101 or settler 105 as shown in the drawing. The material passing to the second tank 105 still contains organic matter which forms as an oily layer at the top of the settling tank 105. This may be recycled back into the decomposed (not shown) or into the stream of crude decomposition products being fed into treating tank 101 through line 84 as indicated in the drawing. When used catalyst is introduced at 120, the organic matter in this oily layer may contain an appreciable amount of hydroperoxide. In the case in which this material is fed back into the treating tank 101 there should be sufficient contact time after the material is fed into the crude decomposition product also being fed thereto in line 100 for the hydroperoxide to decompose before the products are treated with the carbonate slurry in the treating tank 101. A small storage tank (not shown) may be placed on line 100 for this purpose if desired. The heavier material which settles out in tank 105 is fed to a packed stripping column 106 through line 86 wherein the carbonate and neutralized acids of the slurry are stripped of any remaining cumene, acetone, or phenol with the aid of steam entering through line 108. The steam and organic matter carried along therewith through line 88 are condensed out at 107 and fed through line 89, valve 82, and lines 98 and 100 to the crude decomposition products of the hydroperoxide as they are being introduced into treating tank 101. The steam used in the stripping column is a source of additional water needed at this point in the treatment cycle. The amount of steam which is preferably used corresponds to the amount of water which is needed for material balance requirements. Normally, this is sufficient to strip the maximum amount of organic material which may be left in the slurry from the settler 105. The carbonate containing the neutralized acids is removed through line 109.

For best results it has been found that the particle size of the alkaline earth metal carbonate used in preparing the slurry should be as fine as possible in order to get the highest neutralizing efficiency. However, it is advisable that the particles be large enough to permit them to settle out of the mixture in a reasonable time after the liquid has been transferred into a separator tank wherein it is no longer agitated. The amount of water used in the preparation of the slurry is not critical, but it is noteworthy that the carbonate particles settle more rapidly in the presence of aqueous phase than in its absence. An excess of water above the amount soluble in the decomposition product is, therefore, most desirable. However, in order to limit the solubility of the water in the decomposed product, it has been found desirable to provide some cumene (20–30%) in the decomposition product at this stage. This may be accomplished by adding the cumene to the product entering tank 101 or by permitting a small proportion to remain in the earlier stripping step. By so doing, the amount of water can be held within limits and thus avoid the need for removing excessive amounts of water from the products by distillation at a later stage in the process. Crude cumene separated from the phenol by distillation may be recycled to tank 101 or used in the oxidation process.

The following specific example is illustrative of the operation of the process in accordance with the preceding outline but is not to be interpreted as limiting our invention.

To a crude cumene hydroperoxide decomposition product containing unreacted cumene, water, acetone, phenol, alpha-methylstyrene, and acetophenone, was added a sufficient amount of cumene to bring the percentage of unreacted cumene to about 25.3%. The resulting product was introduced into a treating tank along with about the same volume of a slurry of calcium carbonate in water. The slurry contained about 5–10% of calcium carbonate and was for the most part made up of recycled material. The treating tank was sufficiently large so that the hold-up time therein was ¾ of an hour. After leaving the treating tank in which the material was constantly agitated and held at a temperature of about 90° C., it was passed through a cooling system which dropped the temperature to about 50° C. and fed into a separator wherein the calcium carbonate separated out at the bottom in the form of an aqueous phase and was constantly withdrawn therefrom. While the major portion thereof was recycled to the treating tank, a side stream was fed into a second settling tank along with calcium carbonate catalyst slurry obtained from the oxidation step of the hydroperoxide manufactured. In this second settling tank the heavier aqueous slurry was continuously withdrawn from the bottom and sent to a packed stripping column wherein the cumene, acetone, and phenol contained therein were constantly stripped therefrom and condensed and returned to the treating tank. The steam-stripped slurry containing neutralized acids was discarded. An oily layer containing unreacted hydroperoxide, cumene, acetone, and phenol was returned to the feed line containing the crude decomposition product as it was being fed to the treating tank.

The purified product which was recovered as a top layer in the first separating tank was then fed to a storage tank, from which it could later be removed for further processing to recover acetone, cumene, alpha-methylstyrene and phenol therefrom.

It has been found that when decomposed crude cumene hydroperoxide is subjected to treatment with alkaline earth metal carbonate slurry for more than ½ hour in accordance with the teachings of this invention, the product so formed when subjected to standard corrosion test is one-tenth as corrosive as untreated product. As can readily be seen this is a simple, economic method for removing the acidic impurities from the crude phenolic products. It does this in a manner which will not tend to contaminate or lead to the corrosion of apparatus used in subsequent processing steps, and it has furthermore been found to lead to an improvement in the quality of the phenol produced.

While the above description and drawing submitted herewith disclose a preferred and practical embodiment of removing acidic impurities from crude phenolic products, it will be understood that the specific details shown and described are by way of illustration and are not to be construed as limiting the scope of the invention.

We claim:

1. In the continuous process of preparing phenol from tertiary alkyl aromatic compounds the steps involving the removal of acidic impurities from a hydroperoxide decomposition product comprising continuously treating the crude decomposition product with an aqueous slurry of finely divided calcium carbonate under agitated conditions at an elevated temperature while passing said product through a treatment vessel at a rate allowing for a hold-up time at least about ½ hour, cooling the so treated product as it leaves said vessel, mechanically separating from resulting partially purified product said carbonate slurry together with the neutralized acidic impurities, recycling the major portion of said slurry to said treatment vessel, combining the remainder of said slurry with calcium carbonate slurry separated from the hydroperoxide prior to its decomposition, mechanically separating oily liquid from the carbonate slurry, drawing off the oily liquid and feeding it with decomposition product feed to said treatment vessel, removing said partially purified product and continuing its purification to recover the phenol in purified form.

2. In the continuous process of preparing phenol from tertiary alkyl aromatic compounds the steps involving the removal of acidic impurities from a hydroperoxide decomposition product comprising continuously treating the crude decomposition product with an aqueous slurry of finely divided calcium carbonate under agitated conditions at a temperature of about 90° C. while passing said product through a treatment vessel at a rate allowing for a hold-up time at least about ½ hour, cooling the so treated product as it leaves said vessel to a temperature of about 50° C., mechanically separating from the resulting partially purified product said carbonate slurry together with the neutralized acidic impurities, recycling the major portion of said slurry to said treatment vessel, combining the remainder of said slurry with calcium carbonate slurry separated from the hydroperoxide prior to its decomposition, mechanically separating oily liquid from the carbonate slurry, drawing off the oily liquid and feeding it with decomposition product feed to said treatment vessel, removing said partially purified product and continuing its purification to recover the phenol in purified form.

3. In the continuous process of preparing phenol from tertiary alkyl aromatic compounds the steps involving the removal of acidic impurities from a hydroperoxide decomposition product comprising continuously treating the crude decomposition product with an aqueous slurry of finely divided calcium carbonate under agitated conditions at a temperature of about 90° C. while passing said product through a treatment vessel at a rate allowing for a hold-up time of about ¾ hour, cooling the so treated product as it leaves said vessel to a temperature of about 50° C., separating said carbonate slurry together with the neutralized acidic impurities by a settling technique, recycling the major portion of said slurry to said treatment vessel feeding the remainder of said slurry to a settling tank along with calcium carbonate slurry separated from the hydroperoxide prior to its decomposition, settling out the carbonate slurry, drawing off the oily layer formed at the top of said settling tank and feeding it to the decomposition product feed going to said treatment tank, removing the crude neutralized products initially separated from said carbonate slurry by the settling technique and continuing their purification to recover the phenol in purified form.

4. In the continuous process of preparing phenol from tertiary alkyl aromatic compounds the steps involving the removal of acidic impurities from a crude hydroperoxide decomposition product comprising continuously treating the crude decomposition product with an aqueous slurry of finely divided calcium carbonate under agitated conditions at a temperature of about 90° C. while passing said product through a treatment vessel at a rate allowing for a hold-up time of about ¾ hour, cooling the so treated product as it leaves said vessel to a temperature of about 50° C., separating said carbonate slurry together with the neutralized acidic impurities by a settling technique, recycling the major portion of said slurry to said treatment vessel, feeding the remainder of said slurry to a settling tank wherein the carbonate slurry is again settled out forming an oily layer at the top of the tank, drawing off said oily layer and feeding it to the crude decomposition product feed going to said treatment tank, removing the crude neutralized products initially separated from said carbonate slurry by the settling technique and continuing their purification to recover the phenol in purified form.

References Cited in the file of this patent

UNITED STATES PATENTS

| 2,628,983 | Aller et al. | Feb. 17, 1953 |
| 2,727,925 | Walker et al. | Dec. 20, 1955 |
| 2,734,085 | Adams et al. | Feb. 7, 1956 |
| 2,744,143 | Filar | May 1, 1956 |

FOREIGN PATENTS

| 293,860 | Switzerland | Jan. 4, 1954 |
| 1,104,727 | France | June 15, 1955 |
| 754,053 | Great Britain | Aug. 1, 1956 |